United States Patent [19]

Zimmet

[11] 4,165,934

[45] Aug. 28, 1979

[54] MICROFILM CAMERA

[75] Inventor: Hans Zimmet, Dresden, German Democratic Rep.

[73] Assignee: Veb Pentacon-Dresden Kamera-und Kinowerke, Dresden, German Democratic Rep.

[21] Appl. No.: 862,875

[22] Filed: Dec. 21, 1977

[30] Foreign Application Priority Data

Dec. 22, 1976 [DD] German Democratic Rep. .................................. 196529[U]

[51] Int. Cl.² ............................................ G03B 27/52
[52] U.S. Cl. ....................................... 355/55; 355/63; 355/75
[58] Field of Search ...................... 355/63, 40, 39, 44, 355/75, 55

[56] References Cited

U.S. PATENT DOCUMENTS

| | | | |
|---|---|---|---|
| 1,999,616 | 4/1935 | Peterson | 355/75 X |
| 2,730,939 | 1/1956 | Blatherwick | 355/44 |
| 3,139,791 | 7/1964 | Bailey et al. | 355/40 |

*Primary Examiner*—Richard A. Wintercorn
*Attorney, Agent, or Firm*—William Anthony Drucker

[57] ABSTRACT

A microfilm camera is provided which has a camera head positioned above an exposure table. The exposure table included a pivotable glass plate and originals to be photographed can be placed beneath the glass plate or on its upper surface. To enable in-focus pictures of originals in either position to be taken, means are provided to vary the distance between the film in the camera head and the glass plate. In one embodiment the exposure table is mounted on four columns each having a lifting cam operated by a common activating handle. In a second embodiment the camera head can be raised or lowered by a handle operated eccentric cam.

3 Claims, 6 Drawing Figures

MICROFILM CAMERA

BACKGROUND TO THE INVENTION

The invention relates to a microfilm camera with a camera head and an exposure table which comprises an upper pivotable glass plate and a lower bearing surface which is spring-loaded relative to the glass plate.

STATE OF THE ART

On a known microfilm camera, the copy to be photographed is pressed under a tiltable glass plate against an exposure table which resiliently gives way in some portions. Particularly in the case of books, this method of keeping the copy flat in the photographing plane is indispensable. Flat pressing by the tiltable glass plate, by means of the alternate lifting and lowering of the glass plate, is also necessary for the occasional photographing of individual sheets, which are flat at any rate, in order to hold the individual sheet correctly in the photographing plane by placing it against the bottom of the lowered glass plate.

OBJECTS OF THE INVENTION

The aim of the invention is the avoidance of the time-consuming lifting and lowering of the glass plate for the occasional photographing of flat single sheets.

The object of the invention is the provision of a unit by means of which the bottom or top of the glass plate can be aligned in the photographing plane.

SUMMARY OF THE INVENTION

According to the invention, this is brought about in that there is provided a handle which can be optionally shifted to a first position and a second position and which is coupled with a device which changes the distance between the film and the glass plate and by means of which the lower surface of the glass plate can be brought into the photographing plane when the handle is set to the first position and the upper surface of the glass plate is brought into the photographing plane when the handle is set to the second position. According to a first preferred constructional form, the exposure table can be optionally moved by the handle to the first or second position.

PREFERRED FEATURES OF THE INVENTION

Expediently, the exposure table is supported on columns which each carry a bearing cam, which is rigidly connected to the column and comprises two adjusting surfaces which are staggered relative to one another in the direction of the column axis, and a lifting cam which is rotatably mounted on the column and is coupled with the exposure table in the lifting direction, the lifting cams being coupled to one another in the sense of rotation by a chain and the handle being provided on at least one of the lifting cams for the simultaneous rotation of all the lifting cams.

According to another advantageous construction, the camera head can be optionally moved by the handle to the first or second position. Expediently, the camera head is guided in rails which are vertical to the photographing plane, and an eccentric cam, which is provided with the handle, for moving the camera head to the first and second positions is provided on the upright.

BRIEF DESCRIPTION OF THE DRAWINGS

The invention will be explained with reference to some illustrated and described exemplified embodiments. In the drawings.

DESCRIPTION OF PREFERRED EMBODIMENTS

Figure 1:
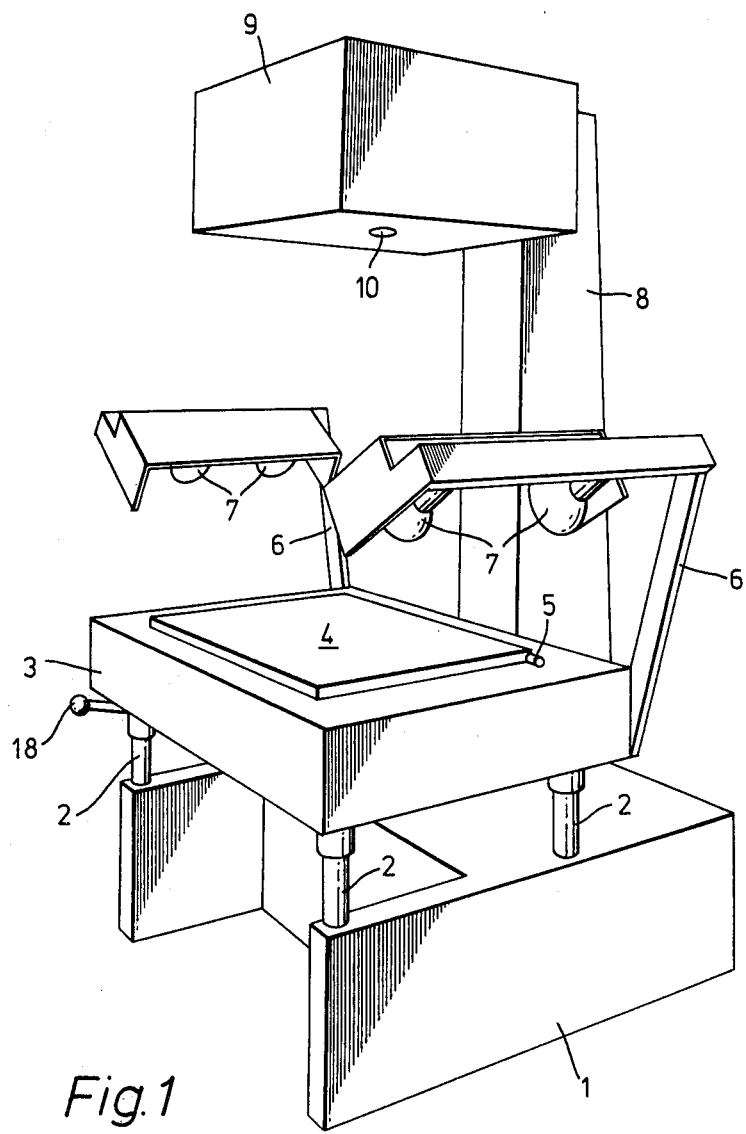
FIG. 1 shows a total view of a microfilm camera showing the adjustment of the exposure table.

On a microfilm camera (see FIG. 1), the exposure table 3 is mounted on the frame 1 by means of columns 2. The supports 6 for the lamps 7 are secured to the exposure table 3. The upright 8 to which the camera head 9 is secured, is rigidly connected to the frame 1. The lens 10 is directed towards the exposure table.

Figure 2:
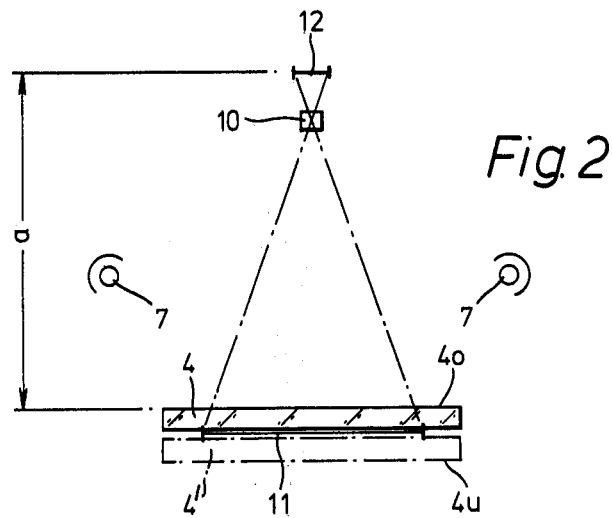
FIG. 2 shows a diagram of the adjustment of the exposure table.

In this arrangement, the lower surface $4u$ of the glass plate 4 forms the photographing plane (see FIG. 2). An image of the copy 11 pressed against the lower surface $4u$ is formed on the film 12 through the lens 10. By a change of the distance a between the film 12 and the glass plate 4, the upper surface $4o$ can be brought into the photographing plane, so that images of copies located on the upper surface 4 can be formed on the film 12 when the glass plate 4 is in the position $4'$.

Figure 3:
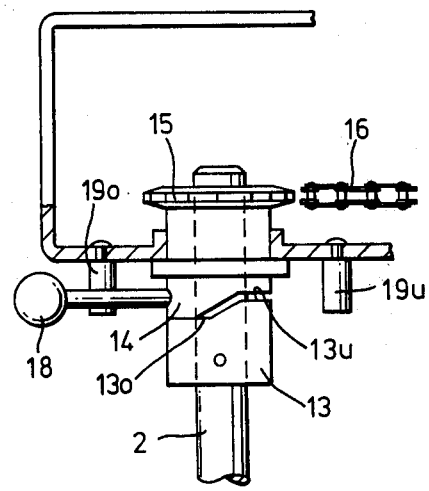
FIGS. 3 and 4 show the device for adjusting the exposure table.
Figure 4:
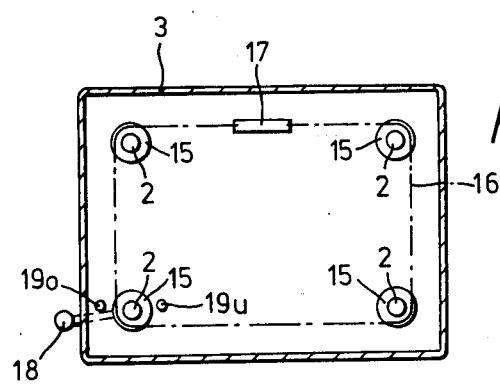

For this purpose, the exposure table 3 is provided with a device to effect adjustment in the direction of the optical axis of the lens 10 (see FIGS. 3 and 4). A bearing cam 13, which comprises axially offset adjusting surfaces $13o$ and $13u$, is rigidly connected to each of the columns 2. The lifting cam 14, to which the chain wheel 15 is rigidly connected, is rotatably mounted on the column 2 and in the exposure table 3. All the chain wheels 15 are coupled with one another by the chain 16, which is held in reliable engagement with the chain wheels 15 by the turnbuckle 17. At least one of the lifting cams 14 is provided with a handle 18.

When the handle 18 is rotated to the position which is shown in FIG. 3 and is fixed by the stop $19o$, the lifting cam 14 rests on the adjusting surface $13o$, so that the flat surface $4o$ of the glass plate 4 is situated in the photographing plane. In this position, it is possible to place as copies for the purpose of photographing single sheets, which are flat at any rate, on top of the glass plate and to exchange them without any need for the time-consuming lifting and lowering of the glass plate 4. When the handle 18 is turned to the position which is fixed by the stop $19u$, the lifting cam 14 slides on the adjusting surface $13u$ of the bearing cam 13 and lifts the exposure table 3 to the position in which the lower surface $4u$ is located in the photographing plane. In this position, sharp images of the copies, which are pressed against the lower surface $4u$ of the glass plate 4, are formed on the film 12.

Figure 6:
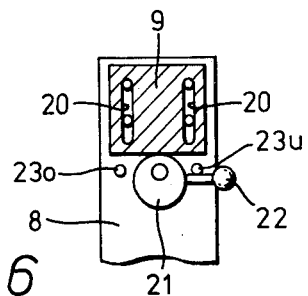
FIG. 6 shows the adjusting device shown in FIG. 5.
Figure 5:
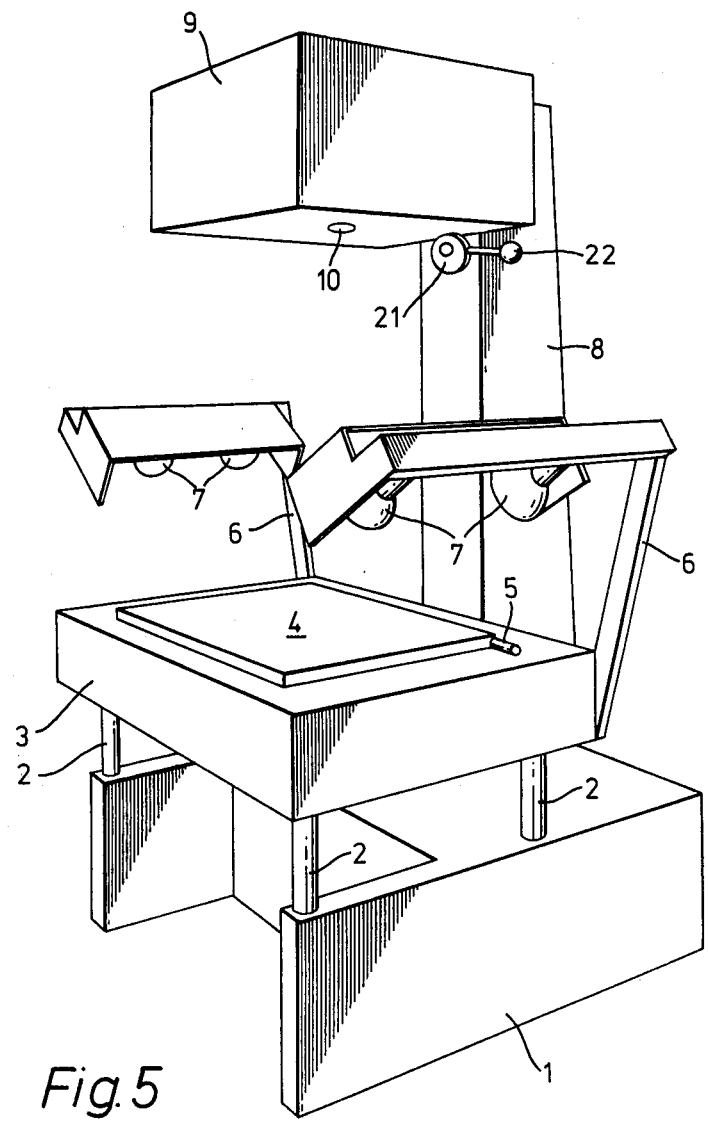
FIG. 5 shows a total view of a microfilm camera showing the adjustment of the camera head.

In another construction according to the invention (see FIG. 5), the camera head 9 is movable in the direction of the optical axis of the lens 10 on the upright 8 in rails 20 (see FIG. 6). The eccentric 21, which can be pivoted by the handle 22 to the positions fixed by the stops $23o$ and $23u$, is rotatably mounted on the upright 8. When the eccentric 21 is situated in the position shown in FIG. 6, then the lower surface 4u of the glass plate 4 is situated in the photographing plane. When the eccentric 21 is pivoted to the position fixed by the stop 23o, then the camera head 9 is lifted and the upper surface 4o of the glass plate 4 is situated in the photographing plane.

Analogously, it would also be possible to adjust, for example, only the film 12 or the lens 10, for which an adjustment by electric motor could be used. Instead of the chain 16, a rope or rod connection can be used.

I claim:

1. In a microfilm camera including an exposure table, a support connected to said exposure table, a camera head mounted on said support, a film support surface provided in said camera head, a glass plate pivotally mounted on said exposure table, and a bearing plate positioned beneath said glass plate and spring loaded in a direction towards said glass plate, the improvement comprising adjustment means for changing the relative distance between said glass plate and said film support between first and second preselected focussing positions, whereby in said first position in-focus pictures of an original inserted between said bearing plate and the under surface of said glass plate can be taken and whereby in said second position in-focus pictures of an original placed on the upper surface of said glass plate can be taken.

2. In a microfilm camera including an exposure table, a support connected to said exposure table; a camera head mounted on said support, a film support surface provided in said camera head, a glass plate pivotally mounted on said exposure table, and a bearing plate positioned beneath said glass plate and spring loaded in a direction towards said glass plate, the improvement comprising adjustment means for changing the relative distance between said glass plate and said film support between first and second preselected focussing positions, whereby in said first position in-focus pictures of an original inserted between said bearing plate and the under surface of said glass plate can be taken and whereby in said second position in-focus pictures of an original placed on the upper surface of said glass plate can be taken, said adjustment means including a manually operable handle for moving said exposure table relative to said support, and further comprising columns supporting said exposure table, a bearing cam carried on each column and comprising adjusting surfaces which are staggered relative to one another in the direction of the column axis and a lifting cam which is rotatably mounted on each said column and which is coupled with said exposure table in the lifting direction, said lifting cams being coupled with one another in the rotational sense by a chain, and said handle being provided on at least one of said lifting cams for the simultaneous rotation of all of said lifting cams.

3. In a microfilm camera including an exposure table, a support connected to said exposure table, a camera head mounted on said support, a film support surface provided in said camera head, a glass plate pivotally mounted on said exposure table, and a bearing plate positioned beneath said glass plate and spring loaded in a direction towards said glass plate, the improvement comprising adjustment means for changing the relative distance between said glass plate and said film support between first and second preselected focussing positions, whereby in said first position in-focus pictures of an original inserted between said bearing plate and the under surface of said glass plate can be taken and whereby in said second position in-focus pictures of an original placed on the upper surface of said glass plate can be taken, said adjustment means including a manually operable handle for moving said camera head relative to said support, and further comprising rails formed on said support and on which said camera head is guided for movement perpendicular to the plane of said exposure table, and an eccentric cam for moving said camera head relative to said support along said rails, said handle being provided on said eccentric cam.

* * * * *